C. H. TOMLINSON.
AUTOMATIC CAR AIR AND ELECTRIC COUPLING MECHANISM.
APPLICATION FILED JULY 29, 1914.
1,287,799.
Patented Dec. 17, 1918.
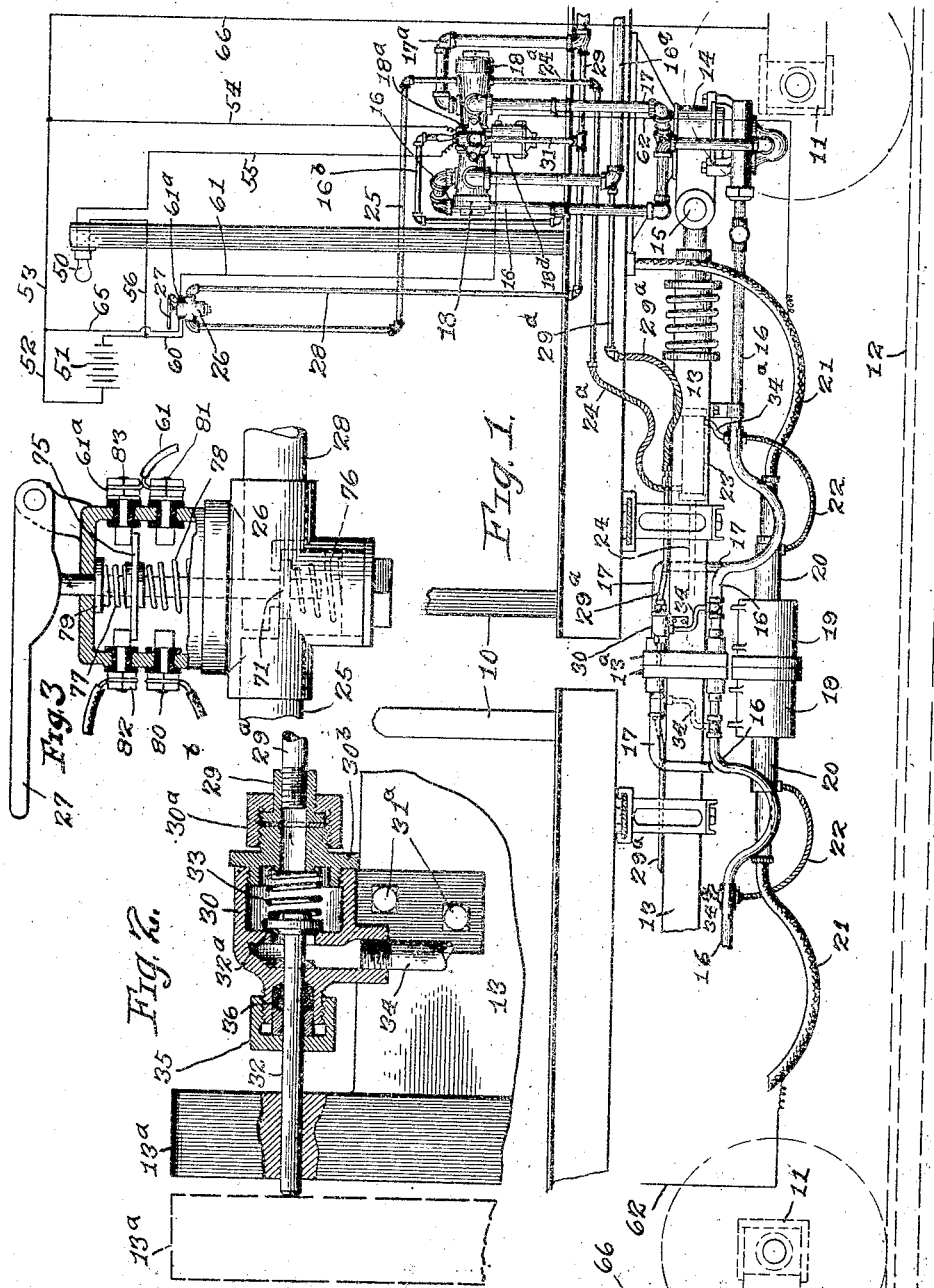

UNITED STATES PATENT OFFICE.

CHARLES H. TOMLINSON, OF MANSFIELD, OHIO.

AUTOMATIC CAR AIR AND ELECTRIC COUPLING MECHANISM.

1,287,799.   Specification of Letters Patent.   Patented Dec. 17, 1918.

Application filed July 25, 1914. Serial No. 353,082.

*To all whom it may concern:*

Be it known that I, CHARLES H. TOMLINSON, a citizen of the United States, residing at Mansfield, in the county of Richland and State of Ohio, have invented certain new and useful Improvements in Automatic Car Air and Electric Coupling Mechanisms, of which the following is a specification.

The invention relates to an improvement in a car coupling system of the class shown in my Patent No. 1,223,223 of April 17, 1917, for automatic car air and electric coupling mechanisms.

In the device of the said application car coupling mechanism is shown which is designed to be automatically operated with respect to the mechanical coupling of the cars together and the usual air and electric systems are also automatically coupled at the same time, with the exception of certain valves or switches which must be manipulated by trainmen from one of the cars or from the ground adjacent either car in order to insure the coupling of the air and electric systems.

The primary object of the invention is to provide improved means which will render the entire coupling action of not only the car coupling device but the air and electric coupling mechanisms automatic, so that the bringing together of two cars into coupling relation, equipped with the device of the invention, will not only couple the cars together automatically but will couple the air and electric devices to automatically operate the valve mechanism controlling the said air and electric coupling devices.

Other objects of the invention will appear from the following specification, which is descriptive of the preferred embodiment of the invention and which is also shown in the drawings forming a part of the specification.

In the drawings:

Figure 1 is a view of broken portions of two cars in coupling relation, broken portions of the supporting trucks therefor and the track being shown diagrammatically. In this view visible portions of the automatic coupling mechanism not only for the cars but for the electric and fluid pressure systems appear in elevation. Fig. 2 is a detail sectional view of the automatic valve mechanism for operating the air and electric coupling devices, showing the same attached to a broken portion of one of the coupler heads by which the valve mechanism is supported. Fig. 3 is an enlarged vertical sectional view through the off valve and switch mechanism connected therewith.

In coupling mechanisms of the character herein shown the devices are employed on the ends of cars adapted to be coupled together in trains of two or more cars, and the successful operation of the devices depends on each of two or more cars being equipped with like or similar devices. In the assembled view, therefore, of Fig. 1, portions of coupling devices on two contiguous cars are shown, and this manner of showing the invention obviously results in a duplication of some of the parts. However, it is sought to avoid duplication in one of the cars by omitting to show the details of anything but the connections, and it will be noted that the same reference characters are applied to the same parts, although they appear as part of the same system in different cars. In the drawings broken portions of the car bodies are indicated by the reference character 10, and the car trucks at 11, while the rail shown of the track is indicated by the reference character 12. The draw-bars or car coupler devices are indicated by the reference character 13, the same being swivelly connected to a portion of the car body of each car by means of a coupling member 14 pivotally connected on a vertical axis with the car body, the coupler head or draw-bar 13 being pivotally connected with the coupling member 14 at 15, as indicated in Fig. 1. The coupling faces of the draw-bars 13 are indicated at 13ª and associated with these coupling faces 13ª there will be car coupler devices for interlocking the two coupler heads together. No specific form of coupler device is shown herein for it will be obvious that the invention may be used with any desired form of automatic car coupling device.

In the form of car air and electric coupling devices illustrated herein, as in my said prior application, I show two fluid pressure lines passing through the cars in parallel directions and each line communicating with a similar line on its coöperating or companion car through the coupler heads or draw-bars 13. For example, by reference to Fig. 1, it will be seen that these two fluid pressure lines pass respectively through the coöperating faces of the draw-bars 13, one near the upper edge of the coupling face 13ª, as indicated by the reference character 17, and one through the lower face, as indicated at 16. The line 16 I call the brake line, and it passes along the under side of the draw-bar to the swivel joint 14 and thence to the main operating valve, which is indicated generally by the reference character 18. The pipe line which is termed the reservoir line and indicated by the reference character 17 parallels the brake line 16 to the swivel connection 14 of the draw-bar 13, and passes thence upwardly to the main controlling valve 18, as shown in Fig. 1. The lines 16 and 17 communicate with the casing of the controlling valve mechanism 18 and with extensions of the same lines as indicated at $17^a$ and $16^a$ beyond the controlling mechanism. 19 indicates a casing or housing which is supported from the under side of each of the coupler heads 13 by any suitable means. The brackets by which these casings are supported from the coupler heads are shown partly broken away in Fig. 1 of the drawings, as this feature constitutes no part of the present invention. Connected with the casings 19 are cylinders 20, which contain any convenient form of pneumatically operated plunger, for operating electrical connections on the interior of the casings 19. These connections, as ordinarily constructed, are movable and their circuit connections pass through the cables 21 to the interior of the cars. Air connections 22 in the form of feed pipes, as shown, supply pressure from the reservoir mains 17 to the cylinders 20. 23 designates a cylinder on and preferably within a hollow portion of the draw-bars 13, the same being supplied with a piston, the rod of which is indicated at 24 and is designed to operate the car coupler devices of any common form, not herein shown, to their uncoupled position by the admission of air pressure to the cylinder 23 through the branch pipe $24^a$, which is in communication with a portion of the main control valve 18, being controlled by this valve and having an extended passage through the pipe 25 beyond the valve in communication with the off valve 71 in casing 26, the operating button or lever of which is indicated at 27. Beyond the valve casing 26 is a pipe 28 connected with the pipe 31 which leads from the pipe 29 to an electro-pneumatic valve operating device indicated by the reference character $18^a$, Fig. 1. This device may be of any desired or suitable construction to operate by suitable means, as an electro-magnet, valve mechanism in casing 18 for controlling the passageways between brake lines 16, $16^a$ and reservoir line pipes 17, $17^a$. The details of a valve mechanism in casing 30 are shown in Fig. 2 from an inspection of which it will be seen that the casing 30 has a depending portion by which it is secured, through bolts or other suitable fastening means indicated at $31^a$, to the coupler head 13. 32 indicates a valve, the stem of which extends forwardly through an opening in the face of the coupler head, so that when seated this stem normally projects a short distance beyond the forward face of the coupler head $13^a$, the valve seat being indicated at $32^a$ on the interior of the casing 30. A coil spring 33 normally holds the valve against its seat so as to close the opening leading from the branch pipe $29^a$ to a by-pass in the form of a pipe 34, which is connected with the brake line 16, as indicated in Fig. 1.

The details of the valve casing 30 and associated parts are shown in the sectional view of Fig. 2, illustrating the preferred manner of constructing this valve and from which it will be seen that the pipe 29 is provided with a nipple $29^b$ having an enlargement adapted to be secured to a threaded nipple on the casing 30 by the gland nut $30^a$. The casing 30 is provided with a chamber and a seat for the valve 32. The casing 30 may for convenience be formed in two parts, one of which parts is indicated by the reference character $30^b$. These parts are illustrated as screw-threaded together and enable the insertion of the valve 32 on the interior of the casing, and also permit the insertion of the coil spring 33, which is interposed between the valve and the casing wall to hold the valve normally in closed position.

The interior of the valve casing 30 is divided in two portions by a perforated wall, as shown in Fig. 2, which latter forms the seat for the valve 32 and the by-pass pipe 34 communicates with the chamber divided from the chamber containing the valve seat, as illustrated in Fig. 2. The stem of the valve 32 is supported by the usual threaded gland nut, as indicated at 35, coöperating with the threaded nipple on the casing 30 and holding in position suitable packing material around the stem of the valve 32, as indicated at 36. The operation of my improved coupling system, equipped with the improvements herein described and claimed, is as follows:

Two cars equipped with the devices illustrated in Fig. 1 are brought together by suitable motive power until their car air and electric coupling devices are brought into the coupling relation, as illustrated in Fig. 1. The car air and electric coupling devices, the details of which are shown in my aforesaid application, will be brought into engaging and coöperating relation which will result in the coupling engagement of the draw-bars 13, the union of the reservoir and brake line pipes 17 and 16 respectively, and the union of suitable electrical contactors on the engaging faces of the casings 19. It will be understood that prior to the mechanical coupling together of the cars the main controlling valve mechanism 18 will be in a position closing the main reservoir and brake lines 17ª and 16ª respectively, but it will be seen that pressure having been established in one of the cars prior to the bringing of the cars together, as for example, in the car on the right of the drawing showing the main controlling valve mechanism, brake line pressure will at the same time be present in the pipe 29ª as far as the valve casing 30. When the forward coupling faces of the coupler heads come together it will be seen that the stem of the valve 32 on each of the coupler heads will be brought into engagement with some portion of the coupler head on the opposite car, which will unseat the valve 32 against the action of the spring 33 and permit the brake line pressure to enter the by-pass 34 into the brake line 16, thus bringing up the pressure in the brake line connection between the main controlling valves on the two cars. The pressure thus established in the brake line 16 will extend throughout this line in the two coöperating cars between the main controlling valves 18 therein. It will be seen that branch line 16ᵇ leading from the brake line 16 is provided and this extends to and communicates with a portion of the casing of the main valve 18, so that upon the establishing of pressure in the brake line 16 the main valve should be operated to the open position, permitting communication between the brake line 16 and the portion thereof as indicated at 16ª beyond the main operating valve. At the same time the operation of the main valve should open the reservoir lines 17 and 17ª so that the pressure in the reservoir lines and brake lines throughout the two coöperating cars will be established. When the pressure is established in the reservoir line 17 between the main control valves on the two cars in the manner described, this pressure passing through the branch pipe 22 to a cylinder 20 of the electrical coupler casing 19, will operate the electrical contactors of a design, for example, like that shown in my application above referred to, to their closed position, so that the electrical circuits passing through the cables 21 will be established between the cars. At the same time, this pressure from the reservoir line system between the valves will enter through the by-pass pipes 34ª into cylinders 23 and will plug these cylinders, locking the pistons on piston rods 24 heretofore referred to in an operated position, thus insuring that the mechanical coupler devices shall be retained in coupling position when the electrical contactors within the casings 19 are in engaging relation with the current passing through them to prevent any destructive arcing due to the premature parting of the cars before the breaking of the circuits.

From the above description it will be seen that the mere bringing together mechanically of the cars into coupling relation in the manner described will, upon the operation of the valve 32 by the contact between each valve stem 32 and the coöperating coupler head, result in opening the fluid pressure system by the operation of the main control valves and establish both fluid pressure and electrical connections between the two coupled cars without any further attention upon the part of the operator. In one of the cars of Fig. 1 I show an electrical signal system consisting of an electric lamp 50, which is adapted to be lighted by the closing of its circuit whenever the valve mechanism within the main operating valve 18 is moved to its open position.

This is a feature of construction more fully described in my aforesaid application and forms no part of the invention herein. It will be sufficient to call attention to the fact that a battery is shown at 51 and the circuit may be traced from this battery through the wires 52, 53, and 54 to some movable part of the main valve mechanism adapted to shift contact points so that the movement of the main valve to the open position will close such contacts and, therefore, close the circuit between the wires 54 and 55 leading to the light 50, which will indicate the movement of the valves, since the circuit to the battery 51 is completed through the wires 56 and 60. The operation of the mechanism for disconnecting or uncoupling the cars is as follows: Assuming that the cars are in coupled relation, as indicated in Fig. 1, an operator or trainman by inspecting the signal lights 50 in either one of the coupled cars can determine that the main operating valves are in open position, if the signal lights are burning. By pressing the lever 27 of the off valve 71 which opens it reservoir pressure in the pipe 28 will pass through the pipe line 25, through the main valve casing 18, which is always open to the passage in the lines 24 and 25 whenever the main valve is operated to open position. Thence this pressure will pass through the line 24ª and through the flexible portion thereof into the cylinder 23 on the piston rod end of the piston therein, which will operate the piston rod 24 and cause the mechanical uncoupling of the cars, since it is preferred that this coupling device be of the form illustrated in my aforesaid application, which may be operated from either car at will. In Fig. 1 I show an electric circuit for operating the main valve controlling mechanism 18ª, which circuit is adapted to be closed by the opening of the off valve 26. This circuit leads from the battery 51 through the wire 60 and through suitable switch mechanism operated by the valve lever 27 to the wire 61 and the electrical engine 18ᵈ, thence through wire 62 to cable 21 through the electrical coupler casing 19 to the cable 21 on the opposite car, where it will pass thence through a wire 62 to the corresponding electric engine mechanism 18ᵈ on that car, thence through wire 61 on that car, not shown in the drawing, thence through the switch mechanism operated to the closed position by the open off-valve 26 on the companion car, thence through a shunt wire extending to the cut-off wire indicated by the reference character 65. In this way it will be seen that the circuit would pass through the open valve 26 on the opposite car, shunting the battery 51 in that car, and would pass through the wire 53 and the extension thereof beyond the terminus of the wire 54 to the down wire 66 of the opposite car leading to the car truck where the current would be grounded through the rail 12 to the truck on the opposite side, and thence up line 66, over line 53, and down line 52 to the battery 51.

In Fig. 3 the detail of the construction of the off-valve 26 is illustrated, and from this view it will be seen that this mechanism comprises a combined valve and electric switch mechanism, the stem of the valve being indicated by the reference character 70, carrying at its lower extremity the valve proper, which is designated by the reference character 71. This valve controls the passageway leading from the pipe 28 to the pipe 25, this pipe being connected with a divided chamber within the valve casing 26, the division wall being indicated by the reference character 72, which latter contains the seat for the valve 71, so that upon the opening of the valve 71 by the depression of the valve stem 70 through hand lever 27, the pressure in the pipe 28 will pass into the pipe 25 for purposes already described. The valve stem 70 carries a switching member in the form of a plate indicated by the reference character 75, and the stem 70 and valve 71 are held normally in the upper closed position by means of a coil spring 76 interposed between the lower extremity of the valve 71 and the valve casing. The plate 75 may be elastically secured relative to the stem 70 by means of coil springs 77 and 78, the former being interposed between the plate 75 and the washer 79 fixed to the stem, and the latter being interposed between the lower surface of the washer 75 and the partition wall in the valve casing above the nut, which the fluid pressure line 28 enters. The circuit wire 60 is secured to a terminal post 80 protruding on the interior of the casing and the circuit wire 61 is likewise secured to an insulated post 81 on the diametrically opposite side of the casing, so that when the valve stem 70 is depressed to open the valve 71 the metal plate 75, by reason of the pressure of the spring 77 thereupon as the valve stem 70 is depressed, will be carried downwardly until it will rest upon the binding posts 80 and 81 and provide a switch connection between these terminals. Upon the release of the hand lever 27 and the consequent closing of the valve 71 and the elevation of the valve stem 70, due to the action of compression spring 76, the spring 78 and the upward movement of the valve stem 70 will carry the plate 25 to an elevated position, where it will contact with the binding posts 82 and 83, which serve as terminals for the shunt wire 65 and the branch wire 61ᵃ from the line 61.

Thus it will be seen that whenever the valve 71 is open, the circuit wires 61 and 65 will be closed through the switch connected with the valve, and that upon the opening of the valve 71 in the opposite car the circuit will be completed and the battery in the car opposite the operator will be shunted.

The operation of the device in uncoupling will now be understood when it is seen that if the operator from either car press the off-valve 71 the reservoir line pressure from branch pipe 28 will pass through the off-valve 71, through pipe 25, to the main control valve 18. When the main valve is in the open position with respect to the reservoir and brake lines 17ᵃ and 16ᵃ, as it will be with the cars in coupled position previous to the uncoupling operation, it is preferred that the passage through the main valve casing 18 between the pipe 25 and the pipe 24ᵃ will be plugged, but the operation of the off-valve 71, as we have seen, will close the circuit between the wires 60 and 61, through binding posts 80 and 81 and switch member 75 of the valve, placing the electric circuit leading to the casing 18ᵈ in circuit with battery 51, with the result that fluid pressure from the reservoir system of pipe 17ᵃ through the branch pipes 29 and 31 will be effective to operate the main valve mechanism within the casing 18, to a position that will close the brake and reservoir lines 17ᵃ and 16ᵃ in both of the cars, and the main valve should be of a type that the described movement will release the pressure in the pipe 25, heretofore referred to as plugged, and permit the fluid pressure to enter the pipe 24ᵃ through the flexible portion thereof in front of the piston, within the cylinder 23, which will result in the operation of the piston of piston rod 24, which controls the car coupling devices. Provision will preferably be made, as described in my aforesaid application, although it forms no part of the present invention, for venting the reservoir line pipe 17 upon the operation of the main control valve 18 to the closed position, which should relieve the pressure in the pipe 22 and permit suitable elastic means, not shown, within the cylinders 20, on both of the cars to withdraw the electrical contactors within the electrical coupling casing 19. Thus it will be seen that the mechanism herein described is capable of automatically coupling the air and electrical connections upon the impact of the coupling devices, and these couplings may be broken up when it is desired to uncouple the cars by the simple operation of the off-valve lever 27 operating the off-valve 26 to its open position from the operator's station in either of the cars. This arrangement is not only convenient but is a saving of time, particularly in the coupling operation, since it is not necessary for the operator to manipulate any levers or switches upon the bringing of the cars together to establish the proper mechanical, fluid and electrical connections for working the cars in their coupled positions.

In order that the invention might be understood, the details of the preferred embodiment have been shown and described, but it is not desired to be limited to the exact details for it will be apparent that persons skilled in the art may resort to various modifications without departing from the spirit of the invention.

I claim:

1. In a system of train pipe coupling devices on two coöperating cars, means for controlling a plurality of fluid pressure connections through the coupling devices, means operatively connected with said coupling devices and adapted to be operated by the bringing together of the coupling devices on the two cars for operating the fluid pressure controlling means, and fluid pressure uncoupling means for said devices.

2. In a system of train pipe coupling devices on two coöperating cars, comprising a reservoir line and a brake line, of valve mechanism for controlling the pressure in said reservoir and brake lines, means for operating the said valve mechanism to the open position by the bringing up of the pressure in the brake line between said valve mechanisms on two coöperating cars, and means for admitting pressure from the brake line to the brake line between said valve mechanisms for bringing up the pressure therein, said last mentioned means being operable by the bringing together of the coupling devices on the two cars.

3. In a system of train pipe coupling devices on two coöperating cars, means for controlling a plurality of fluid pressure devices, comprising a reservoir line and a brake line, valve mechanism for controlling said reservoir line and said brake line, fluid pressure operating means for operating said valve mechanism to the closed position, means under the control of the operator for operating the last said means, fluid pressure means for operating the said valve mechanism to the open position, and means operable by the bringing together of the coupling devices on two coöperating cars for controlling the said fluid pressure operated means for controlling the main valve.

4. In a system of train pipe coupling devices on two coöperating cars, comprising coöperating coupler heads, a plurality of fluid pressure lines having connections in said coupler heads, valve mechanism for controlling said fluid pressure connections, means for operating said valve mechanism to the open position by the bringing together of said coupling devices, and fluid pressure uncoupling means for said devices.

5. In a system of train pipe coupling devices on two coöperating cars comprising coöperating coupler heads, a plurality of fluid pressure lines having connections in said coupler heads, valve mechanism for controlling said fluid pressure connections, automatic means for operating said valve mechanism to the open position by the bringing together of said coupler heads, and fluid pressure uncoupling means for said devices.

6. In a system of train pipe coupling devices on two coöperating cars, remote controlling means whereby a plurality of pressure connections through the coupling devices may be operated to the closed position by an operator from a station in one of the cars, and means for automatically opening said plurality of pressure connections through the coupling devices upon the bringing together of coupling devices on two coöperating cars.

7. In a system of train pipe coupling devices on a plurality of coöperating cars, means whereby a plurality of fluid pressure connections between the cars may be closed by an operator in one of the cars, and means for opening the said fluid pressure connections by the bringing together of the train pipe coupling devices on the two coöperating cars.

8. In a system of train pipe coupling devices on a plurality of coöperating cars, means whereby a plurality of fluid connections on both cars may be operated to the closed position by an operator from one of the cars, and means for opening said fluid connections upon the bringing together of the coupling devices on two coöperating cars.

9. In car coupling apparatus, a system of train pipe coupling devices on two coöperating cars, comprising a plurality of fluid pressure connections through the couplers, valve mechanism in each car for controlling said connections, automatic means for opening said valve mechanism by the abutting of the car couplings, and means on each car for closing the valve mechanism in both cars.

10. A system of train coupling devices, comprising means whereby the opening of a plurality of fluid valves on two coöperating cars is effected automatically by the bringing together of the train pipe coupling devices, and means for closing said fluid valves on the two said cars by the operator from a station in one of the cars.

11. In a system of train pipe coupling devices on two coöperating cars, means whereby a plurality of fluid pressure connections through the coupling devices may be brought to the open position automatically by the bringing together of the coupling devices, and means under the control of an operator from a station in one of the cars for closing the said fluid pressure connections from a station in one of the cars.

12. In a system of train pipe coupling devices on two coöperating cars, the combination with a reservoir line system and a brake line system, of valve mechanism in each of said cars for synchronously controlling the brake line and reservoir line systems, said valve mechanism being adapted to be operated to the open position by the bringing of the pressure in the brake line system between the said valve mechanism in two coöperating cars up to the normal pressure of the brake line system in either of the cars, and means on the coupler heads adapted to be operated by the bringing together of two coöperating coupler heads for bringing up the pressure of said brake line system between said valve mechanism of the two coöperating cars and for operating said valve mechanism to the open position.

13. In a system of train pipe coupling devices on two coöperating cars, comprising a reservoir line and a brake line, the combination of synchronously operated valve mechanism for controlling the pressure in said reservoir and brake lines, means for operating said valve mechanism to the open position by the bringing up of the pressure in the brake line between said valve mechanisms on the two coöperating cars, means for by-passing air from the brake line on one side of the valve mechanism to the brake line on the other side of said valve mechanism and between the valve mechanisms in two coöperating cars, and a device adjacent the said coupling devices and adapted to be operated by the bringing together of two coöperating coupling devices for by-passing the air from the brake line on one side of one of the said controlling valve mechanisms to the brake line on the other side of said valve mechanisms.

14. In an automatic car coupling system, train pipe coupling devices on two coöperating cars comprising a plurality of fluid pressure connections through the couplers, valve mechanism in each car for controlling said connections, means for opening said mechanism by the bringing together of the couplers, and means on each car to close the valve mechanism in both cars.

15. In an automatic car coupling system, a mechanical coupler for automatically connecting the vehicles, a fluid pressure uncoupling device for the mechanical coupler, fluid pressure connections through the coupler, an electrical coupler connected with the mechanical coupler for electrically connecting the vehicles, fluid pressure means for automatically connecting the electrical coupler when the mechanical coupling is made, and means for disconnecting the mechanical and electrical couplers of both cars from a station in one of them.

16. A coupling for vehicles comprising a mechanical coupler for automatically connecting the vehicles, an electrical coupler connected therewith for electrically connecting the vehicles, fluid pressure means for automatically connecting the electric coupler when the mechanical coupling is made, and means for disconnecting the mechanical and electrical couplings from a station in one of the cars.

17. A coupling for vehicles, comprising a mechanical coupler automatically coupled upon moving the cars together, fluid pressure uncoupling means therefor; an electrical coupler and automatic fluid pressure means for electrically connecting the vehicles when the mechanical coupling is made, fluid pressure connections through the couplers, and means in each vehicle for controlling the fluid under pressure in both couplers to disconnect the mechanical and electrical couplers.

18. A coupling for vehicles, comprising train pipe coupling means connected through the couplers, valve mechanism for controlling said coupling means, an electrical coupler for electrically connecting the vehicles, fluid pressure means for controlling the electrical coupler, means for opening said mechanism to connect the electrical coupler by the bringing together of the couplers, and means on each car to disconnect the electrical coupler and close the valve mechanism in both cars.

19. In an automatic car coupling; a mechanical coupler connected by bringing the cars together, and fluid pressure means for uncoupling it; an electrical coupling connected to the mechanical coupler for electrically connecting the cars; train pipe couplers connected through the mechanical coupler; fluid pressure means for operating the electrical coupling when the cars are brought together; and means in each car to operate the electrical couplers in both cars for disconnecting them.

20. A coupling device for vehicles comprising an electrical coupler for electrically connecting the vehicles, a fluid pressure coupler, fluid pressure means for connecting the electrical coupler when the vehicles are brought together, and means in each vehicle to control the fluid pressure means in both vehicles in disconnecting the electrical coupler.

21. A coupling for vehicles, comprising a mechanical coupler connected upon impact, an electrical coupler, fluid pressure means connected through the mechanical coupler and including means for automatically connecting the electrical coupler, fluid pressure means for uncoupling the mechanical coupler, and valvular means in each vehicle for operating the uncoupling means and for controlling the electrical controllers in both vehicles to disconnect them.

In testimony whereof I have signed my name to this specification, in the presence of two subscribing witnesses, on this 12th day of May, A. D. 1914.

CHARLES H. TOMLINSON.

Witnesses:
C. MARKS,
G. L. BUCHAN.